United States Patent
Horie et al.

(10) Patent No.: US 11,054,731 B2
(45) Date of Patent: Jul. 6, 2021

(54) LIGHT SOURCE DEVICE AND PROJECTION TYPE DISPLAY APPARATUS

(71) Applicant: NEC Display Solutions, Ltd., Tokyo (JP)

(72) Inventors: Osamu Horie, Tokyo (JP); Chikatoshi Fukuda, Tokyo (JP)

(73) Assignee: SHARP NEC DISPLAY SOLUTIONS, LTD., Tokyo (JP)

( * ) Notice: Subject to any disclaimer, the term of this patent is extended or adjusted under 35 U.S.C. 154(b) by 165 days.

(21) Appl. No.: 16/478,816

(22) PCT Filed: Feb. 3, 2017

(86) PCT No.: PCT/JP2017/004051
§ 371 (c)(1),
(2) Date: Jul. 17, 2019

(87) PCT Pub. No.: WO2018/142589
PCT Pub. Date: Aug. 9, 2018

(65) Prior Publication Data
US 2021/0132481 A1    May 6, 2021

(51) Int. Cl.
*G03B 21/20* (2006.01)
*H04N 9/31* (2006.01)
(Continued)

(52) U.S. Cl.
CPC ........... *G03B 21/204* (2013.01); *G02B 13/22* (2013.01); *G02B 26/008* (2013.01);
(Continued)

(58) Field of Classification Search
CPC ............ G03B 21/2013; G03B 21/2066; G03B 21/208; G03B 21/204; H04N 9/3164
See application file for complete search history.

(56) References Cited

U.S. PATENT DOCUMENTS

| | | | |
|---|---|---|---|
| 2006/0146296 A1* | 7/2006 | Lin | H04N 9/315 353/94 |
| 2010/0060860 A1 | 3/2010 | Huang | |

FOREIGN PATENT DOCUMENTS

| | | |
|---|---|---|
| JP | 2000-003612 A | 1/2000 |
| JP | 2006-308714 A | 11/2006 |

(Continued)

OTHER PUBLICATIONS

Japanese Office Action, dated Jun. 9, 2020, in Japanese Application No. 2018-565208 and English Translation thereof.
(Continued)

*Primary Examiner* — Ryan D Howard
(74) *Attorney, Agent, or Firm* — McGinn IP Law Group, PLLC

(57) ABSTRACT

A light source device includes first and second surface light sources, a first optical system that forms light source images of the first and second surface light sources on an image forming surface, an optical element provided with a columnar light guide section, and a second optical system that forms, on an entrance surface of the light guide section, an image of a synthesis surface light source comprising the light source images of the first and second surface light sources. The first optical system includes a reflection element provided with a first reflection surface that reflects a first light flux from the first surface light source toward the image forming surface, and a second reflection surface that reflects a second light flux from the second surface light source toward the image forming surface and that is at right angles to the first reflection surface.

12 Claims, 8 Drawing Sheets

(51) Int. Cl.
*G02B 26/00* (2006.01)
*G02B 13/22* (2006.01)

(52) U.S. Cl.
CPC ....... *G03B 21/208* (2013.01); *G03B 21/2013* (2013.01); *G03B 21/2066* (2013.01); *H04N 9/3152* (2013.01); *H04N 9/3161* (2013.01); *H04N 9/3164* (2013.01)

(56) References Cited

FOREIGN PATENT DOCUMENTS

| | | |
|---|---|---|
| JP | 2007-140344 A | 6/2007 |
| JP | 2010-026260 A | 2/2010 |
| JP | 2010-066362 A | 3/2010 |
| JP | 2010-091846 A | 4/2010 |
| JP | 2010-129503 A | 6/2010 |
| JP | 2010-164731 A | 7/2010 |
| JP | 2010-170989 A | 8/2010 |
| JP | WO 2010/146683 A1 | 12/2010 |
| JP | 2011-138140 A | 7/2011 |
| JP | 2011-221504 A | 11/2011 |
| JP | 2013-092752 A | 5/2013 |
| WO | WO 2012/104958 A1 | 8/2012 |
| WO | WO 2015/129656 A1 | 9/2015 |

OTHER PUBLICATIONS

International Search Report (ISR) (PCT Form PCT/ISA/210), in PCT/JP2018/003414, dated Apr. 3, 2018.
International Search Report (ISR) (PCT Form PCT/ISA/210), in PCT/JP2017/004051, dated Apr. 25, 2017.

* cited by examiner

[Figure 1]
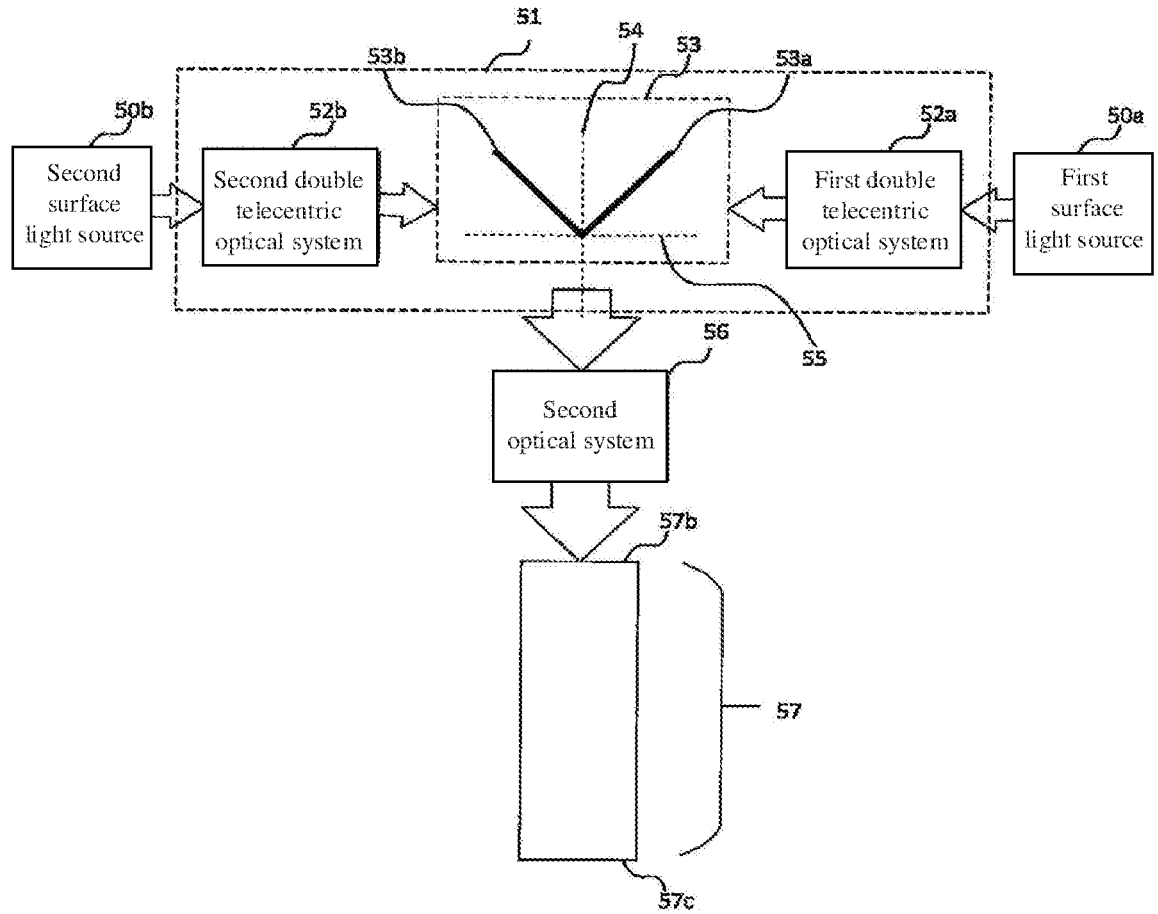
[Figure 2]
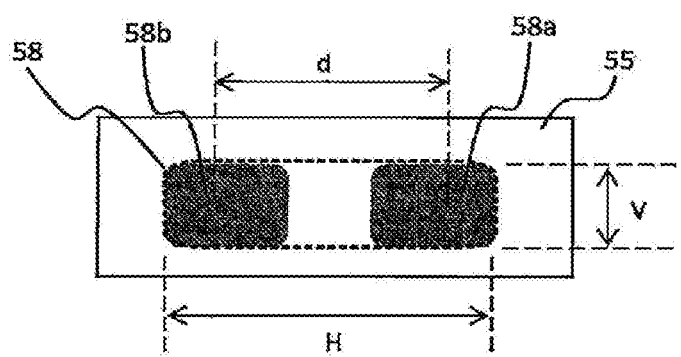

[Figure 3]
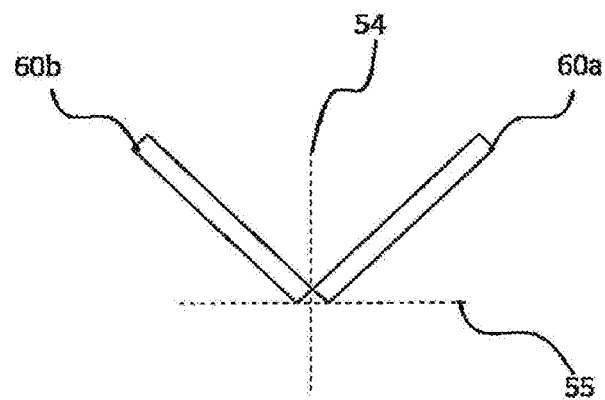
[Figure 4]
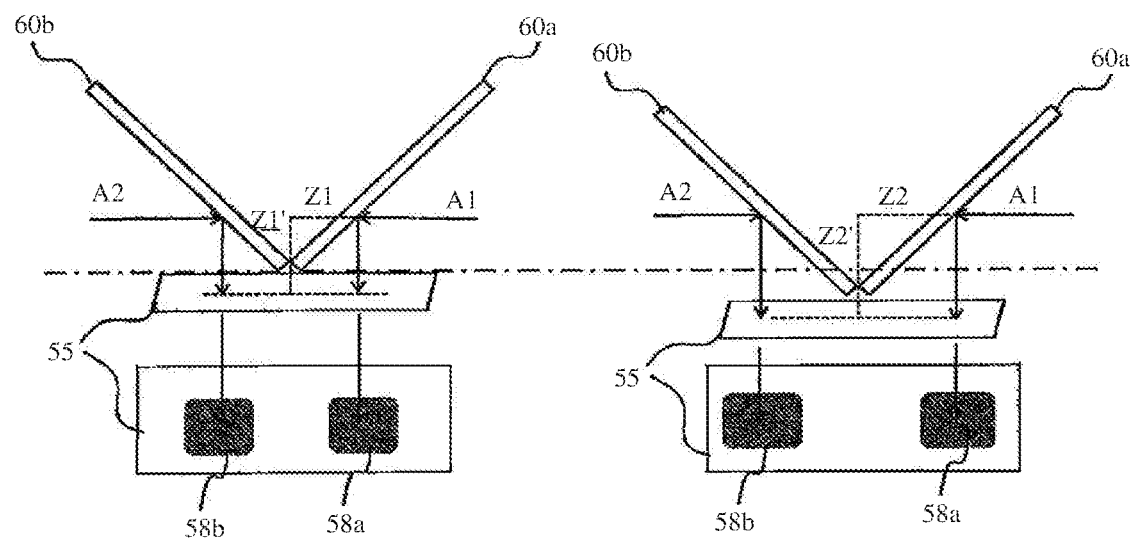
[Figure 5]
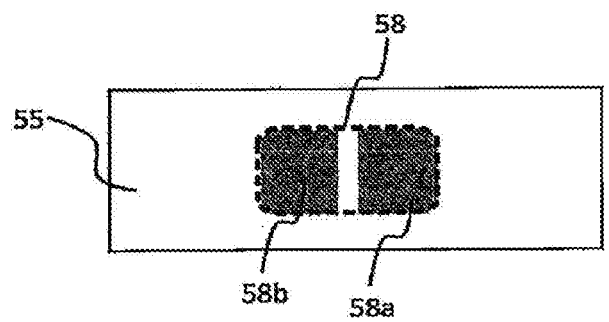

[Figure 6]
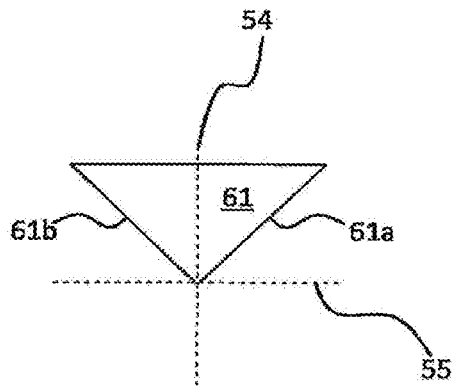
[Figure 7]
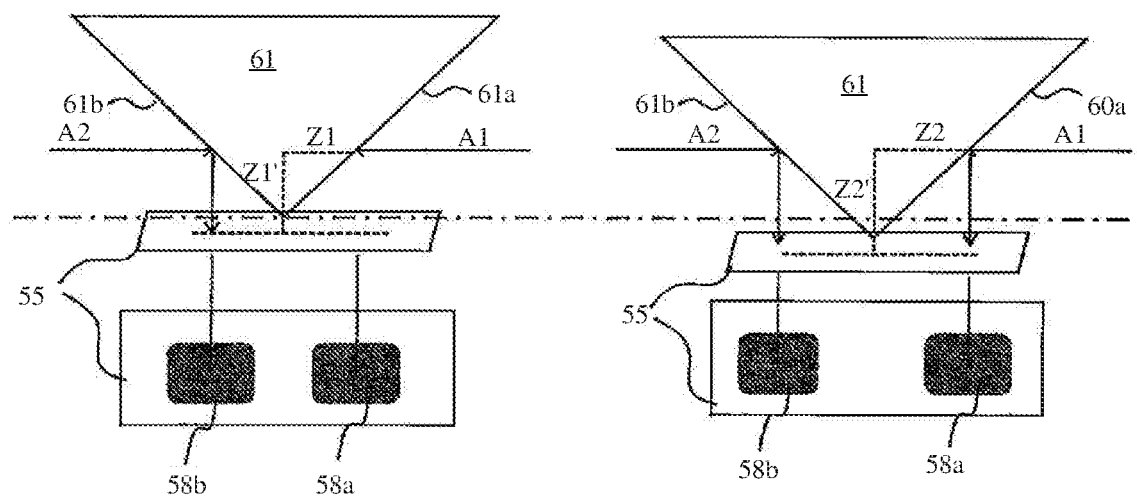
[Figure 8A]
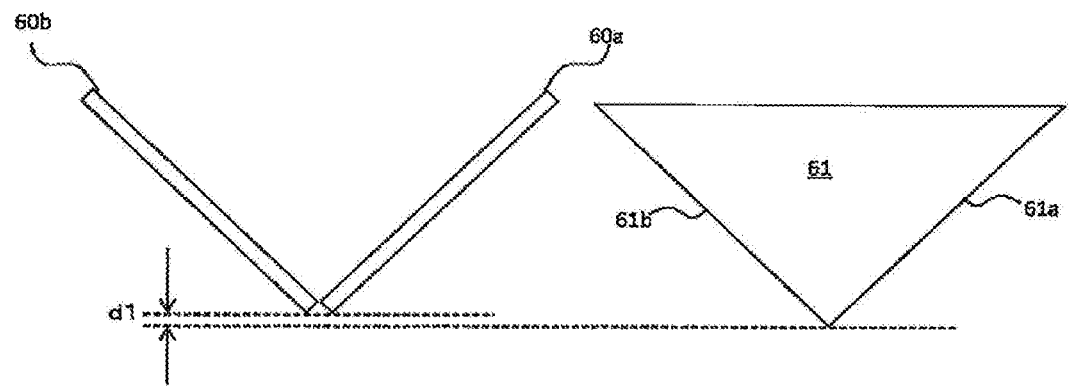

[Figure 8B]
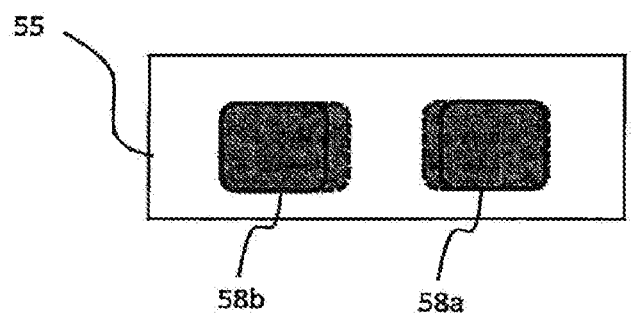

[Figure 9]
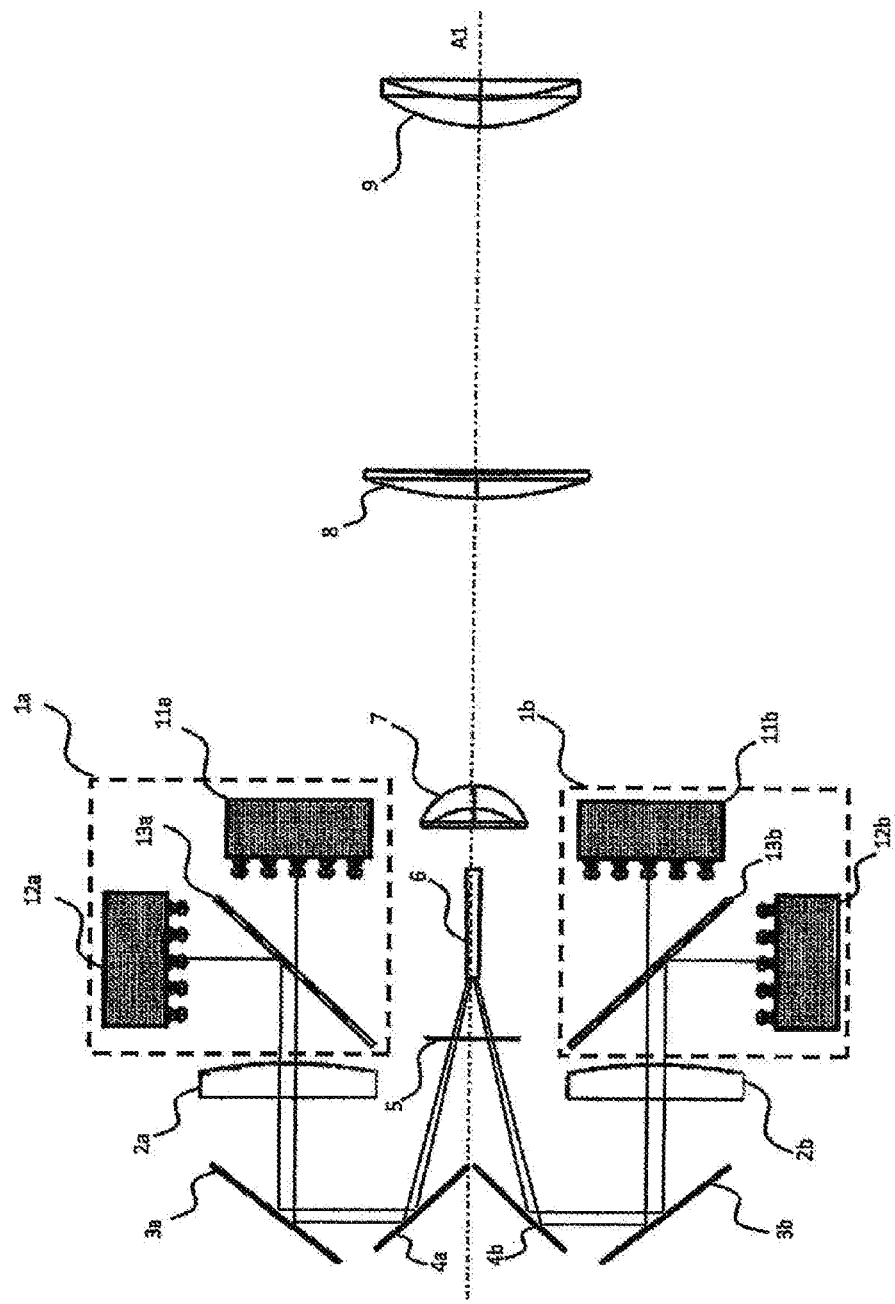

[Figure 10]
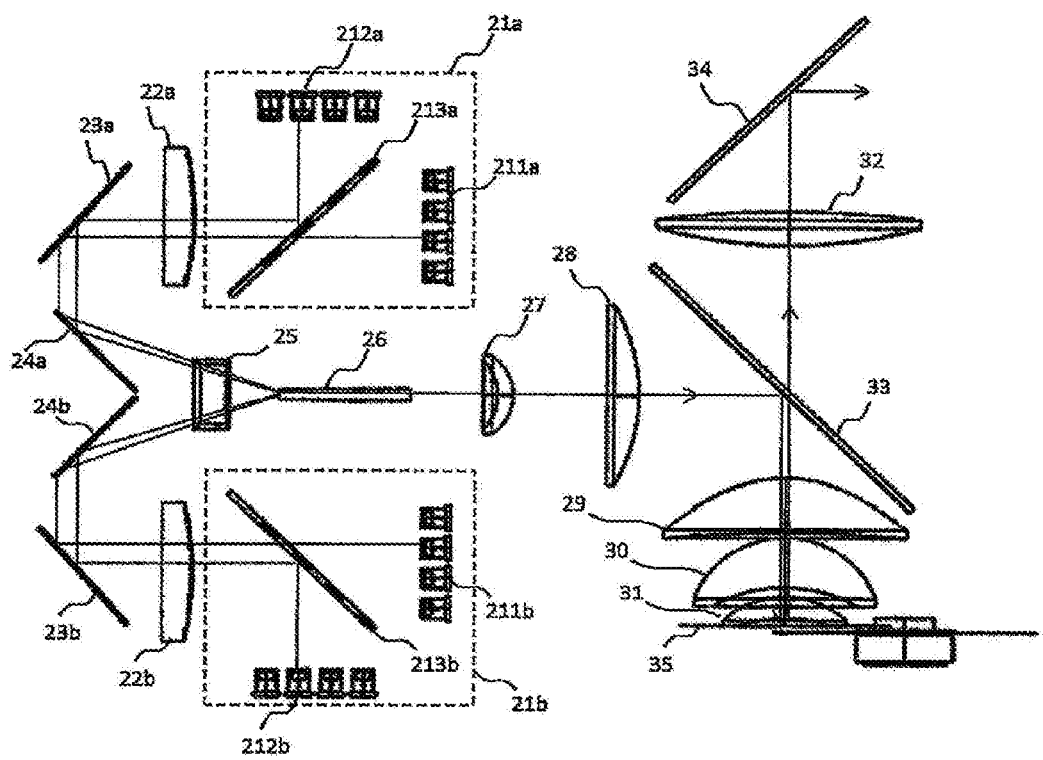

[Figure 11]
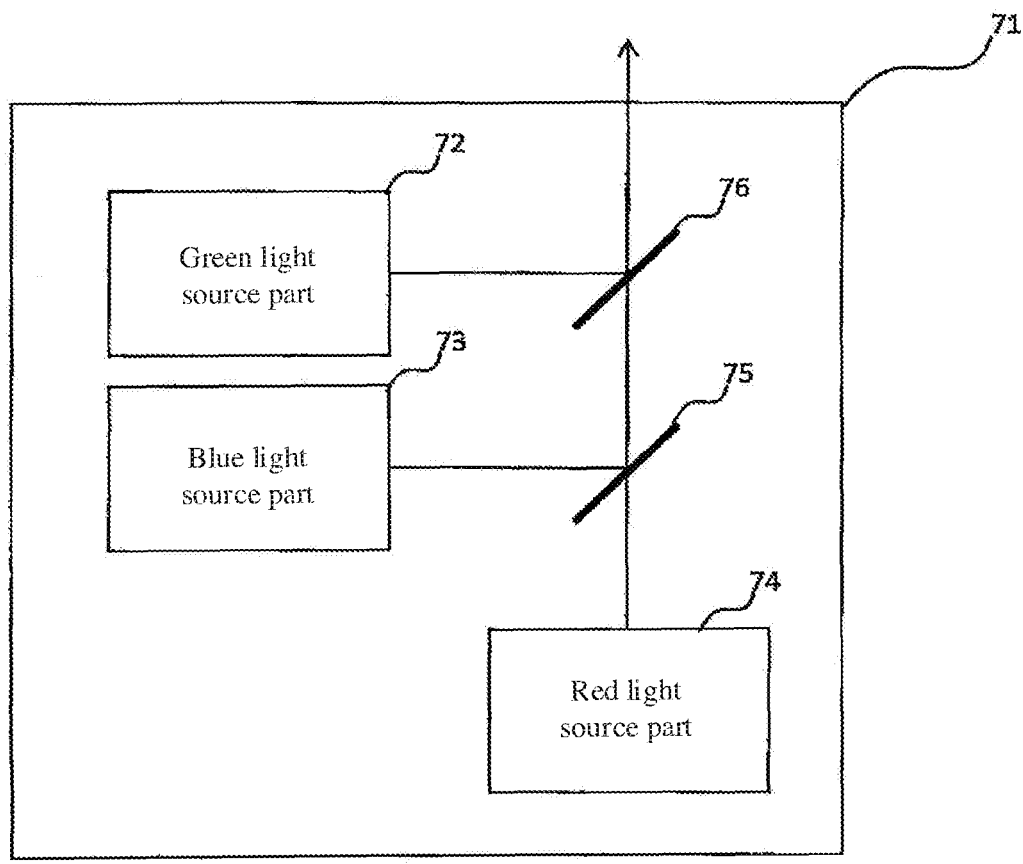

[Figure 12]
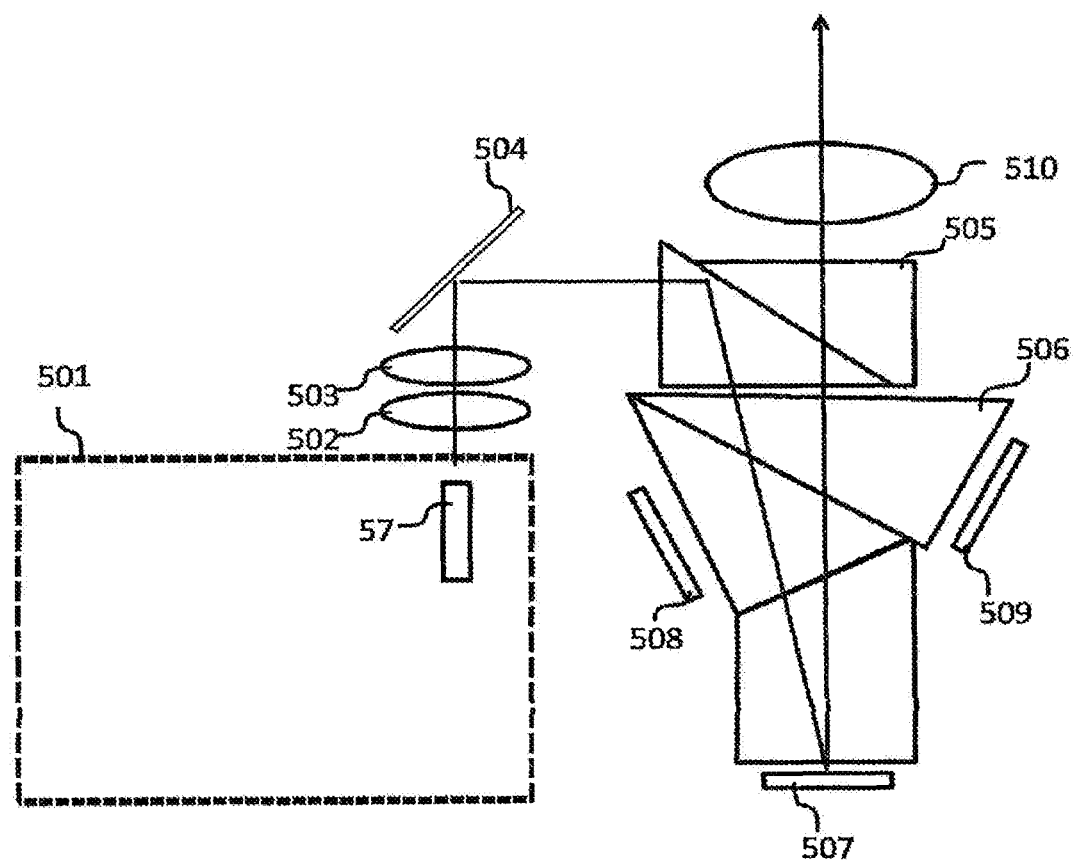

LIGHT SOURCE DEVICE AND PROJECTION TYPE DISPLAY APPARATUS

TECHNICAL FIELD

The present invention relates to a light source device and a projection type display apparatus.

BACKGROUND ART

In recent years, a solid light source such as a laser diode (LD) or a light emitting diode (LED), a light source in which a fluorescent substance is used, or the like has been used as a light source of a projection type display apparatus for reasons of reliability, stability and the like. In the projection type display apparatus provided with these light sources, a high luminance is achieved.

Patent Literature 1 describes a projection type display apparatus in which a solid light source is used. This projection type display apparatus includes first and second light source sections, a rod integrator, a display element and a projection lens.

The display element is a digital micromirror device (DMD), and has an image forming surface comprising a plurality of two-dimensionally arranged micromirrors.

The rod integrator is provided with a quadrangular prismatic columnar light guide section (solid). One of both end surfaces of the light guide section is an entrance surface, and the other surface is an exit surface. Light that enters the entrance surface propagates through the light guide section while repeating reflection, to exit from the exit surface. The shape of the exit surface of the light guide section is analogous to the shape of the image forming surface of the display element.

The first and second light source sections each comprise a solid light source, and emit light of the same color. Output light of the first light source section enters a first region of the entrance surface of the rod integrator via a first optical system. Output light of the second light source section enters a second region, which is different from the first region, of the entrance surface of the rod integrator via a second optical system. The light source image of the first light source section is formed in the first region, and the light source image of the second light source section is formed in the second region.

A light flux that exits from the exit surface of the rod integrator enters the display element. In the display element, an incident light flux is modulated with each micromirror based on an input video signal to form the image. The projection lens projects, onto a screen, the image of each color formed on the display element.

In the above projection type display apparatus, light fluxes from two light source sections are synthesized in the rod integrator, thereby achieving a high luminance.

Additionally, in the projection type display apparatus, there is a restriction called etendue that is defined by a product of a sectional area of the light flux and a divergence angle (a solid angle determined by the light). To efficiently utilize the light from the light source as projection light, it is necessary to set an etendue on an irradiation side to be less than or equal to an etendue on an acceptance side. Here, the etendue on the irradiation side is given by the product of an area of the light source and the divergence angle of the light that exits from the light source, and the etendue on the acceptance side is given by the product of the area of the display element and the acceptance angle (a solid angle) determined by F-number of the projection lens.

In the projection type display apparatus described in Patent Literature 1, the etendue on the irradiation side is given by the product of the area of a surface light source formed on the exit surface of the rod integrator and the divergence angle of the light flux that exits from the exit surface. The etendue on the acceptance side is given by the product of the area of the image forming surface of the display element and the acceptance angle (the solid angle) determined by the F-number of the projection lens.

CITATION LIST

Patent Literature

Patent Literature 1: JP2011-221504A

DISCLOSURE OF THE INVENTION

Technical Problem

However, in the projection type display apparatus described in Patent Literature 1, there are problems as follows:

Light source images of first and second light source sections are formed in first and second regions of the entrance surface of a rod integrator, respectively. However, these light source images have different sizes, and additionally, the acceptance angle (a solid angle) of output light of each light source section into each region also differs. Consequently, brightness unevenness occurs in a light flux that exits from the rod integrator.

Note that in the projection type display apparatus described in Patent Literature 1, the relation between the size or an interval of the light source image of each light source section which is formed on the entrance surface of the rod integrator and the etendue is not taken into consideration. Consequently, even if the light source images of the respective light source sections have the same size, the light utilization efficiency in an optical system at the post-stage of the rod integrator may decrease.

An object of the present invention is to provide a light source device and a projection type display apparatus in which the above problem is solved and a light utilization efficiency can improve.

Solution to Problem

To achieve the above object, according to one aspect of the present invention, there is provided a light source device comprising:

first and second surface light sources;

a first optical system that forms light source images of the first and second surface light sources in different regions on an identical image forming surface;

an optical element that is provided with a columnar light guide section and in which one of both end surfaces of the light guide section is considered as an entrance surface, and the other surface is considered as an exit surface; and a second optical system that forms, on the entrance surface of the light guide section, an image of a synthesis surface light source comprising the light source images of the first and second surface light sources which are formed on the image forming surface, wherein the first optical system includes a reflection element provided with a first reflection surface that reflects a first light flux from the first surface light source toward the image forming surface, and a second reflection surface that reflects a second light flux from the second surface light source toward the image forming surface and that is at right angles to the first reflection surface.

According to another aspect of the present invention, there is provided a projection type display apparatus comprising:

the above light source device;

a display element that modulates light output from the light source device to form an image; and a projection lens that projects the image formed by the display element.

Advantageous Effect of Invention

According to the present invention, a light utilization efficiency can improve.

BRIEF DESCRIPTION OF DRAWINGS

FIG. 1 is a schematic view showing a configuration of a light source device according to an example embodiment of the present invention.

FIG. 2 is a schematic view showing an example of a light source image of a surface light source formed on a first image forming surface of the light source device shown in FIG. 1.

FIG. 3 is a schematic view showing a V-shaped mirror that is an example of a reflection element of the light source device shown in FIG. 1.

FIG. 4 is a schematic view showing change in the light source image when the V-shaped mirror shown in FIG. 3 is moved in a direction vertical to the first image forming surface.

FIG. 5 is a schematic view showing a synthesis surface light source formed on the first image forming surface when the reflection element is disposed so that vignetting occurs.

FIG. 6 is a schematic view showing a right angle prism that is another example of the reflection element of the light source device shown in FIG. 1.

FIG. 7 is a schematic view showing change in the light source image when the right angle prism shown in FIG. 6 is moved in a direction vertical to the first image forming surface.

FIG. 8A is a schematic view explaining a positional relation between the right angle prism and an apex angle portion of the V-shaped mirror, when the synthesis surface light source of a predetermined size is formed in a state of the occurrence of the vignetting.

FIG. 8B is a schematic view showing an example of the light source image formed on the first image forming surface in the state shown in FIG. 8A.

FIG. 9 is a schematic view showing an example of a light source part in which a solid light source is used.

FIG. 10 is a schematic view showing an example of a light source part provided with a fluorescent light source.

FIG. 11 is a schematic view showing an example of a light source part provided with light sources of respective colors of red, blue, and green.

FIG. 12 is a schematic view showing a configuration of a projection type display apparatus that is another example embodiment of the present invention.

EXAMPLE EMBODIMENTS

Next, description will be made as to an example embodiment of the present invention with reference to the drawings.

FIG. 1 is a schematic view showing a configuration of a light source device according to the example embodiment of the present invention.

Referring to FIG. 1, the light source device is a light source device for use in a projection type display apparatus, and includes first and second surface light sources $50a$ and $50b$, first optical system 51, second optical system 56 and optical element 57. First and second surface light sources $50a$, $50b$ have the same structure, and have a light emitting surface in a predetermined shape (here, a square).

Optical element 57 is provided with prismatic light guide section $57a$. One of both end surfaces of light guide section $57a$ is entrance surface $57b$, and the other end surface is exit surface $57c$. Light that enters entrance surface $57b$ propagates through light guide section $57a$ while repeating reflection, and exits from exit surface $57c$. Thus, the light is reflected in light guide section $57a$ a plurality of times, so that a uniform surface light source can be formed on exit surface $57c$. A light tunnel including a hollow interior and an inner surface constituted of a mirror, a prismatic columnar rod formed of a transparent material such as glass, or the like can be used as light guide section $57a$.

First optical system 51 forms light source images of first and second surface light sources $50a$, $50b$ in different regions on first image forming surface 55. First optical system 51 includes reflection element 53, first double telecentric optical system $52a$ and second double telecentric optical system $52b$. Here, the double telecentric optical system means a telecentric optical system in which an optical axis and a principal ray are parallel both on an object side and on an image side.

Reflection element 53 is provided with first and second reflection surfaces $53a$ and $53b$ provided to form right angles to each other. First double telecentric optical system $52a$ is provided on an optical path between first surface light source $50a$ and first reflection surface $53a$, and forms a light source image of first surface light source $50a$ on first image forming surface 55 via first reflection surface $53a$. Second double telecentric optical system $52b$ is provided on an optical path between second surface light source $50b$ and second reflection surface $53b$, and forms a light source image of second surface light source $50b$ on first image forming surface 55 via second reflection surface $53b$.

First double telecentric optical system $52a$ and second double telecentric optical system $52b$ have the same structure, and are arranged so that exit surfaces face each other via reflection element 53. A principal ray (an optical axis) of a first light flux from first double telecentric optical system $52a$ matches a principal ray (an optical axis) of a second light flux from second double telecentric optical system $52b$ on the same axis.

Virtual image forming surface 54 indicates an image forming surface in a state where respective first and second reflection surfaces $53a$ and $53b$ of first double telecentric optical system $52a$ and second double telecentric optical system $52b$ are not interposed. Virtual image forming surface 54 and first image forming surface 55 are perpendicular to each other.

An angle formed by first reflection surface $53a$ and virtual image forming surface 54 is 45°, and an angle formed by the principal ray of the light flux from first double telecentric optical system $52a$ and first reflection surface $53a$ is 45°. Similarly, an angle formed by second reflection surface $53b$ and virtual image forming surface 54 is also 45°, and an angle formed by the principal ray of the light flux from second double telecentric optical system $52b$ and second reflection surface $53b$ is also 45°. First reflection surface $53a$ and second reflection surface 53b reflect the first light flux from first double telecentric optical system 52a and the second light flux from second double telecentric optical system 52b in the same direction.

First double telecentric optical system 52a, second double telecentric optical system 52b and reflection element 53 are arranged so that a synthesis surface light source has a predetermined shape (e.g., a predetermined aspect ratio). Here, the predetermined shape is a shape in which an etendue is taken into consideration and which can improve light utilization efficiency in an optical system at the post-stage of optical element 57. The shape (the aspect ratio) of exit surface 57c of light guide section 57a substantially matches the shape (an aspect ratio) of the image forming surface.

The principal ray of the first light flux from first double telecentric optical system 52a and the principal ray of the second light flux from second double telecentric optical system 52b are located on the same axis. When seen from a direction vertical to a surface that is perpendicular to first reflection surface 53a and second reflection surface 53b, the apex angle portion that is a joined portion of first and second reflection surfaces 53a and 53b may be disposed on the principal ray side from the outermost peripheral portion of the first and second light fluxes. In this case, vignetting is caused in the first and second light fluxes in the apex angle portion, so that it is possible to improve light utilization efficiency that will be described later.

Second optical system 56 forms, on entrance surface 57b of light guide section 57a, an image of the synthesis surface light source comprising the light source images of the first and second surface light sources which are formed on first image forming surface 55. Second optical system 56 may include a third double telecentric optical system.

FIG. 2 schematically shows the light source images of first and second surface light sources 50a and 50b which are formed on first image forming surface 55. In FIG. 2, light source image 58a is the light source image of first surface light source 50a, and light source image 58b is the light source image of second surface light source 50b. Light source images 58a and 58b have a mutually linearly symmetric shape. Light source images 58a and 58b are formed at interval d. Synthesis surface light source 58 comprises light source images 58a and 58b. A ratio (H:V) of size H of synthesis surface light source 58 in a horizontal direction and size V in a vertical direction is the aspect ratio. First double telecentric optical system 52a, second double telecentric optical system 52b and reflection element 53 are arranged so that this aspect ratio becomes a predetermined aspect ratio that can improve the light utilization efficiency in the optical system at the post-stage of optical element 57.

According to the light source device of the present example embodiment, when the device is applied to the projection type display apparatus, there is produced an effect of improving the light utilization efficiency.

Hereinafter, a specific configuration of the light source device of the present example embodiment will be described.

In the light source device of the present example embodiment, reflection element 53 can be constituted of a V-shaped mirror or a right angle prism.

FIG. 3 schematically shows the V-shaped mirror that is an example of reflection element 53. This V-shaped mirror comprises two reflecting portions 60a and 60b provided so that their reflection surfaces form right angles to each other. In each of reflecting portions 60a and 60b, the reflection surface is formed on a surface which is opposite to a virtual image forming surface 54 side, and an angle formed by this reflection surface and virtual image forming surface 54 (or first image forming surface 55) is 45°.

FIG. 4 schematically shows a change in light source images 58a and 58b when the V-shaped mirror is moved in a direction vertical to first image forming surface 55. In FIG. 4, solid arrow line A1 indicates an optical axis (the principal ray of the first light flux) of first double telecentric optical system 52a, and solid arrow line A2 indicates an optical axis (the principal ray of the second light flux) of second double telecentric optical system 52b. Reference signs Z1 and Z2 indicate the distance from an intersection point of reflecting portion 60a with optical axis A1 on reflection surface to virtual image forming surface 54, and reference signs Z1' and Z2' indicate the distance from the intersection point of reflecting portion 60a with optical axis A1 on the reflection surface to first image forming surface 55.

On the left side of FIG. 4, light source images 58a and 58b formed when Z1=Z1' are shown, and on the right side of FIG. 4, light source images 58a and 58b formed when Z2 (>Z1)=Z2' are shown. In the case where Z2 (>Z1)=Z2', an area (a spot size) of each of light source images 58a and 58b increases, and the interval between light source images 58a and 58b broadens, as compared with the case where Z1=Z1'.

When reflection element 53 is moved in the direction vertical to first image forming surface 55, there are conditions as follows:

(1) An incident angle of the first and second light fluxes into reflecting portions 60a and 60b (or first image forming surface 55) does not change.

(2) An image forming performance of first and second surface light sources 50a and 50b onto first image forming surface 55 does not change.

(3) When the vignetting occurs in the apex angle portion, an area of light source images 58a and 58b decreases.

(4) Width H of synthesis surface light source 58 in the horizontal direction and interval D between light source images 58a and 58b are proportional to double of the amount of movement of reflection element 53 in the vertical direction.

In consideration of the above conditions, first double telecentric optical system 52a, second double telecentric optical system 52b and reflection element 53 are arranged so that synthesis surface light source 58 has a predetermined shape that can improve the light utilization efficiency in the optical system at the post-stage of optical element 57. Specifically, reflection element 53 is disposed so that the vignetting occurs in the first and second light fluxes at apex angles of reflecting portions 60a and 60b.

FIG. 5 schematically shows synthesis surface light source 58 formed on first image forming surface 55 when reflection element 53 is disposed so that the vignetting occurs in the first and second light fluxes. Thus, reflection element 53 is disposed so that the vignetting occurs in the first and second light fluxes, so that interval D between light source images 58a and 58b can decrease as much as possible. Thus, synthesis surface light source 58 is formed in the predetermined shape and interval D between light source images 58a and 58b is decreased, so that deterioration of the light utilization efficiency due to the restriction of the etendue can be minimized. As a result, a high luminance can be achieved.

Hereinafter, description will be specifically made regarding the relationship between the vignetting and the etendue in a DMD that is an example of reflection element 53.

When a deflection angle of a micromirror of the DMD is θ, F-value (F-number) of the projection lens is given by Equation 1 as follows:

$$F_{no} = 1/(2 \times \sin\theta) \quad \text{(Equation 1)}$$

For example, when the micromirror operates at a deflection angle of ±12°, $F_{no}$=2.40486 (nearly equal to F/2.4) results from Equation 1 described above. When $F_{no}$ changes, brightness changes at a square of a ratio of the change. In an existing 1.38 type size DMD, F/2.5 (nearly equal to 11.5° or less). Consequently, hereinafter, description will be made in an example at F/2.5.

The etendue is given by Equation 2 as follows:

$$E = \pi \times A \times \sin^2\theta = \pi \times A \div 4F_{no}^2 \quad \text{(Equation 2)},$$

in which A is an area of the DMD (an area of the image forming surface), and θ is the deflection angle of the micromirror. The size of the 1.38 type size DMD in a horizontal direction (H) is 30.96 mm, and the size in a vertical direction (V) is 16.33 mm (A=505.66 mm²). In Equation 2 described above, when F/2.5, E=63.54. Therefore, the product of the area of the surface light source formed on first image forming surface 55 and the divergence angle (a solid angle) of light emitted from this surface light source is brought to be close to 63.54, so that the light from the light source can be efficiently utilized.

In the present example embodiment, to minimize the deterioration of the light utilization efficiency, the vignetting is caused as shown in FIG. 5. Consequently, sizes H and V of synthesis surface light source 58 can be set to 14.0 mm and 7.6 mm, respectively, and E=67.5 can be obtained (provided that light of 3% is cut for the vignetting). This etendue value of 67.5 is close to the above etendue value of 63.54.

Note that when reflection element 53 is disposed so that the vignetting does not occur, E=94.5 is obtained, and this value noticeably deviates from the above etendue value of 63.54.

An angle of the DIM on the image forming surface when E=67.5 is 11.9°. On the other hand, an angle of the DMD on the image forming surface when E=94.5 is 14.1°. When these angles are converted into F-numbers to obtain a ratio of brightness, the brightness increases as much as about 29% in the case where E=67.5.

As described above, reflection element 53 causes the vignetting, so that the deterioration of the light utilization efficiency due to the restriction of the etendue can be minimized, and a high luminance can be achieved.

Next, another example of reflection element 53 will be described.

FIG. 6 schematically shows a right angle prism that is another example of reflection element 53. Right angle prism 61 has reflection surfaces 61a and 61b that form right angles to each other. An angle formed by reflection surface 61a and virtual image forming surface 54 (or first image forming surface 55) is 45°. An angle formed by reflection surface 61b and virtual image forming surface 54 (or first image forming surface 55) is also 45°.

FIG. 7 schematically shows change in light source images 58a and 58b when right angle prism 61 is moved in the direction vertical to first image forming surface 55. In FIG. 7, solid arrow line A1 indicates the optical axis (the principal ray of the first light flux) of first double telecentric optical system 52a, and solid arrow line A2 indicates the optical axis (the principal ray of the second light flux) of second double telecentric optical system 52b. Reference signs Z1 and Z2 indicate a distance from an intersection point with optical axis A1 on reflection surface 61a to virtual image forming surface 54, and reference signs Z1' and Z2' indicate a distance from the intersection point with optical axis A1 on reflection surface 61a to first image forming surface 55.

On the left side of FIG. 7, light source images 58a and 58b formed when Z1=Z1' are shown, and on the right side of FIG. 7, light source images 58a and 58b formed when Z2 (>Z1)=Z2' are shown. Similarl to the V-shaped mirror shown in FIG. 4, in the case where Z2 (>Z1)=Z2', the area (the spot size) of each of light source images 58a and 58b increases, and the interval between light source images 58a and 58b broadens, as compared with the case where Z1=Z1'.

First double telecentric optical system 52a, second double telecentric optical system 52b and right angle prism 61 are arranged so that synthesis surface light source 58 has a predetermined shape that can improve the light utilization efficiency in the optical system of and after optical element 57. Specifically, right angle prism 61 is disposed so that the vignetting occurs in the first and second light fluxes at apex angles of reflection surfaces 61a and 61b.

Also in a case where right angle prism 61 described above is used, operations and effects are produced in the same manner as in a case where the V-shaped mirror is used.

Furthermore, such effects as follows are produced in the case where right angle prism 61 is used as compared with the case where the V-shaped mirror is used.

FIG. 8A schematically shows a positional relation between apex angle portions of right angle prism 61 and the V-shaped mirror when synthesis surface light source 58 is formed in the predetermined shape (size) in the state of the occurrence of the vignetting. FIG. 8B schematically shows light source images 58a and 58b formed on first image forming surface 55 in a state shown in FIG. 8A.

The apex angle portion of right angle prism 61 is a right angle surface, while the apex angle portion of the V-shaped mirror (a joined portion of reflecting portions 60a and 60b) does not become the right angle surface. Consequently, as shown in FIG. 8A, the apex angle portion of right angle prism 61 is located on first image forming surface 55 side as much as height dl from the joined portion of reflecting portions 60a and 60b of the V-shaped mirror in the direction vertical to first image forming surface 55. As a result, as shown in FIG. 8B, light source images 58a and 58b (broken lines) in the case where right angle prism 61 is used become larger than light source images 58a and 58b (solid lines) in the case where the V-shaped mirror is used. In the case where the right angle prism 61 is used and in the case where the V-shaped mirror is used, the size of synthesis surface light source 58 does not change, but light source images 58a and 58b (the solid lines) enlarge. Consequently, the light can be more efficiently received, and the light utilization efficiency can further improve.

Next, configurations of first and second surface light sources 50a and 50b and first and second double telecentric optical systems 52a and 52b will be specifically described.

A first light source part comprising first surface light source 50a and first double telecentric optical system 52a and a second light source part comprising second surface light source 50b and second double telecentric optical system 52b have the same structure as each other. As first and second surface light sources 50a and 50b, solid light sources can be used.

FIG. 9 shows an example of the light source part in which the solid light source is used. The light source part includes light source units 1a and 1b, condensing lenses 2a and 2b, reflection mirrors 3a, 3b, 4a, and 4b, diffusion plate 5, light pipe 6 and lenses 7 to 9. Note that FIG. 9 only shows trajectories of some of light rays for convenience.

Light source unit 1a includes solid light sources 11a and 12a that emit light of the same color, and reflection mirror 13a. Solid light sources 11a and 12a have the same structure, and have, for example, a plurality of laser diodes (LDs) that output laser light with a central wavelength in a wavelength region of a predetermined color. Here, there is used the solid light source in which (n (rows)×m (columns)) LDs are formed on a holding member provided with a heat radiating portion.

Reflection mirror 13a is a mirror of a stripe structure in which reflection regions and transmission regions are alternately arranged. For example, strip-shaped reflection regions are vapor deposited at predetermined intervals on a transparent substrate, so that the mirror of the stripe structure can be formed.

Each column of the LDs of solid light source 11a corresponds to each transmission region of reflection mirror 13a on one-to-one basis. Laser light that exits from the LDs of each column passes through the corresponding transmission region of reflection mirror 13a. Each column of the LDs of solid light source 12a corresponds to each reflection region of reflection mirror 13a on one-to-one basis. The laser light that exits from the LDs of each column is reflected, by the corresponding reflection region of reflection mirror 13a, in the same direction as a travel direction of the laser light transmitted through the transmission region. The laser light transmitted through the transmission region and the laser light reflected by the reflection region constitute the output light of light source unit 1a, and this output light enters condensing lens 2a.

Light source unit 1b outputs light of the same color as in light source unit 1a, and includes solid light sources 11b and 12b and reflection mirror 13b. A part that comprises solid light sources 11b and 12b and reflection mirror 13b has the same structure as in the above part that comprises solid light sources 11a and 12a and reflection mirror 13a. The laser light that exits from solid light source 11b is transmitted through each transmission region of reflection mirror 13b. The laser light that exits from solid light source 12b is reflected, by each reflection region of reflection mirror 13b, in the same direction as a travel direction of the laser light transmitted through the transmission region. The laser light transmitted through the transmission region and the laser light reflected by the reflection region constitute the output light of light source unit 1b, and this output light enters condensing lens 2b.

The laser light that passes through condensing lens 2a successively passes through reflection mirrors 3a and 4a and diffusion plate 5 to enter an entrance surface of light pipe 6. Similarly, the laser light that passes through condensing lens 2b successively passes through reflection mirrors 3b and 4b and diffusion plate 5 to enter the entrance surface of light pipe 6.

Each of light source units 1a and 1b can be called the light source part. Condensing lenses 2a and 2b and reflection mirrors 3a, 3b, 4a, and 4b can be called light return means.

A length of a first optical path from light source unit 1a to the entrance surface of light pipe 6 is equal to a length of a second optical path from light source unit 1b to the entrance surface of light pipe 6. A condensing angle (the angle given by 2θ, when an angle formed by an optical axis and an outermost light ray of a light flux is considered as θ) of condensing lens 2a is the same as that of condensing lens 2b. The incident angle of a central light ray of the light flux that enters the entrance surface of light pipe 6 in the first optical path is the same as the incident angle of a central light ray of the light flux that enters the entrance surface of light pipe 6 in the second optical path.

Light pipe 6 is an optical element (a light uniformizing element) that comprises a columnar light guide, and in which one of both surfaces of the light guide is considered as an entrance surface, the other surface is considered as an exit surface, and light enters the entrance surface and propagates through the light guide to exit from the exit surface. The light is reflected a plurality of times in the light guide, so that a uniform surface light source can be formed on the exit surface. As light pipe 6, there can be used a light tunnel including a hollow interior and an inner surface constituted of a mirror, a rod formed in a polygonal prismatic column of a transparent material such as glass, or the like.

Condensing lens 2a condenses the laser light from light source unit 1a and the light enters the entrance surface of light pipe 6. Condensing lens 2b condenses the laser light from light source unit 1b and the light enters the entrance surface of light pipe 6. Condensing lenses 2a and 2b on the entrance surface of light pipe 6 may be configured so that respective condensing positions become identical.

Lenses 7 to 9 constitute a double telecentric optical system. This double telecentric optical system is first double telecentric lens optical system 52a or second double telecentric optical system 52b shown in FIG. 1.

According to the above structure of the light source part, a space around light pipe 6 is utilized, and light source units 1a and 1b are arranged in this space, so that miniaturization of the device can be achieved.

Furthermore, the laser light that exits from each of light source units 1a and 1b is returned to enter the entrance surface of light pipe 6. Thus, the optical path is returned, so that miniaturization of the device can be achieved.

The above described configuration of the light source part can be applied to each of the light source part comprising first surface light source 50a and first double telecentric optical system 52a and the light source part comprising second surface light source 50b and second double telecentric optical system 52b in the light source device shown in FIG. 1. The exit surface (an opening surface) of light pipe 6 constitutes a surface light emitting portion, and a light source image of this surface light emitting portion is formed as light source image 58a or 58b on first image forming surface 55.

Next, another configuration example of each of first and second surface light sources 50a and 50b and first and second double telecentric optical systems 52a and 52b will be described.

Each of first and second surface light sources 50a and 50b may be a fluorescent light source in which a fluorescent substance is used. The fluorescent light source may include an excitation light source that emits excitation light, and a fluorescent portion provided with the fluorescent substance excited by the excitation light to emit fluorescence. In this case, the fluorescent substance may emit green fluorescence.

FIG. 10 shows an example of the light source part provided with the fluorescent light source.

Referring to FIG. 10, the light source part includes light source units 21a and 21b, condensing lenses 22a and 22b, reflection mirrors 23a, 23b, 24a, 24b, and 34, diffusion plate 25, light pipe 26, lenses 27 to 32, dichroic mirror 33 and fluorescent wheel 35. Note that FIG. 10 only shows trajectories of some of light rays for convenience.

Light source units 21a and 21b are the excitation light sources that excite the fluorescent substance, and emit the excitation light of the same color.

Light source unit 21a includes solid light sources 211a and 212a that emit the excitation light of the same color, and reflection mirror 213a. Solid light sources 211a and 212a have the same structure, and are provided with, for example, a plurality of laser diodes (LDs) that output blue laser light with a central wavelength in a wavelength region of a blue color. Here, there is used the solid light source in which (n (rows)×m (columns)) blue LDs are formed on a holding member provided with a heat radiating portion.

Reflection mirror 213a is a mirror of a stripe structure in which reflection regions and transmission regions are alternately arranged. For example, strip-shaped reflection regions are vapor deposited at predetermined intervals on a transparent substrate, so that the mirror of the stripe structure can be formed.

Each column of the blue LDs of solid light source 211a corresponds to each transmission region of reflection mirror 213a on one-to-one basis. Blue laser light that exits from the blue LDs of each column passes through the corresponding transmission region of reflection mirror 213a. Each column of the blue LDs of solid light source 212a corresponds to each reflection region of reflection mirror 213a on one-to-one basis. The blue laser light that exits from the blue LDs of each column is reflected, by the corresponding reflection region of reflection mirror 213a, in the same direction as a travel direction of the blue laser light transmitted through the transmission region. The blue laser light transmitted through the transmission region and the blue laser light reflected by the reflection region constitute the output light of light source unit 21a, and this output light enters condensing lens 22a.

Light source unit 21b includes solid light sources 211b and 212b and reflection mirror 213b. A part that comprises solid light sources 211b and 212b and reflection mirror 213b has the same structure as in the above part that comprises solid light sources 211a and 212a and reflection mirror 213a. The blue laser light that exits from solid light source 211b is transmitted through each transmission region of reflection mirror 213b. The blue laser light that exits from solid light source 212b is reflected, by each reflection region of reflection mirror 213b, in the same direction as a travel direction of the blue laser light transmitted through the transmission region. The blue laser light transmitted through the transmission region and the blue laser light reflected by the reflection region constitute the output light of light source unit 21b, and this output light enters condensing lens 22b.

The blue laser light that passes through condensing lens 22a successively passes through reflection mirrors 23a and 24a and diffusion plate 25 to enter an entrance surface of light pipe 26. Similarly, the blue laser light that passes through condensing lens 22b successively passes through reflection mirrors 23b and 24b and diffusion plate 25 to enter the entrance surface of light pipe 26.

A length of a first optical path from light source unit 21a to the entrance surface of light pipe 26 is equal to a length of a second optical path from light source unit 21b to the entrance surface of light pipe 26. A condensing angle of condensing lens 22a is the same as that of condensing lens 22b. The incident angle of a central light ray of the light flux that enters the entrance surface of light pipe 26 in the first optical path is the same as the incident angle of a central light ray of the light flux that enters the entrance surface of light pipe 26 in the second optical path.

Light pipe 26 is an optical element (a light uniformizing element) which comprises a columnar light guide, and in which one of both surfaces of the light guide is considered as an entrance surface, the other surface is considered as an exit surface, and light enters the entrance surface and propagates through the light guide to exit from the exit surface. The light is reflected a plurality of times in the light guide, so that a uniform surface light source can be formed on the exit surface. As light pipe 26, there can be used a light tunnel including a hollow interior and an inner surface constituted of a mirror, a rod formed in a polygonal prismatic column of a transparent material such as glass, or the like.

Condensing lens 22a condenses the laser light from light source unit 21a, so that the light enters the entrance surface of light pipe 26. Condensing lens 22b condenses the laser light from light source unit 21b, so that the light enters the entrance surface of light pipe 26. Condensing lenses 22a and 22b on the entrance surface of light pipe 26 may be configured so that respective condensing positions become identical.

In a travel direction of the blue laser light (blue excitation light) that exits from the exit surface of light pipe 26, lenses 27 and 28 and dichroic mirror 33 are arranged in this order. Lenses 27 and 28 are condensing lenses. Dichroic mirror 33 has reflection and transmission characteristics of reflecting light of the wavelength region of the blue color and transmitting light of another wavelength region, in a wavelength region of visible light. The blue laser light from light pipe 26 passes through lenses 27 and 28 and is then reflected by dichroic mirror 33.

In a travel direction of the blue laser light (reflection light) from dichroic mirror 33, lenses 29 to 31 and fluorescent wheel 35 are arranged in this order. Lenses 29 to 31 are condensing lenses.

Fluorescent wheel 35 includes a rotatable round substrate, and a fluorescent portion formed along a circumferential direction on this round substrate. A central portion of the round substrate is supported by an output shaft of a rotary motor, and the rotary motor rotates the round substrate. The fluorescent portion includes a fluorescent substance that can be excited by the blue laser light from dichroic mirror 33. As the fluorescent substance, there can be used a yellow fluorescent substance that emits yellow fluorescence, a green fluorescent substance that emits green fluorescence, or the like. Here, the green fluorescent substance is used.

The blue laser light from dichroic mirror 33 passes through lenses 29 to 31, and then enters the fluorescent portion of fluorescent wheel 35. The green fluorescence (divergent light) emitted from the fluorescent portion passes through lenses 29 and 30. The green fluorescence that passed through lenses 29 and 30 is transmitted through dichroic mirror 33. In a travel direction of the green fluorescence (transmission light) from dichroic mirror 33, lens 32 and reflection mirror 34 are arranged in this order. Lens 32 is a condensing lens.

In lenses 27 to 32, lenses 27 to 31 condense the blue laser light that exits from the exit surface of light pipe 26, onto the fluorescent portion of fluorescent wheel 35. Furthermore, lenses 29 to 32 act so as to condense the green fluorescence (the divergent light) emitted from the fluorescent portion. The green fluorescence that passed through lens 32 is reflected by reflection mirror 34. The reflection light (green fluorescence) from reflection mirror 34 is an output of the light source part. In an optical path of the green fluorescence that passed through lens 32, a lens to obtain a parallel light flux may be disposed.

Lenses 27, 28 and 32 and at least one lens provided in an optical path that passed through lens 32 constitute a double telecentric optical system. This double telecentric optical system is first double telecentric optical system 52a or second double telecentric optical system 52b shown in FIG. 1.

The above described configuration of the light source part can be applied to each of the light source part comprising first surface light source 50a and first double telecentric optical system 52a and the light source part comprising second surface light source 50b and second double telecentric optical system 52b in the light source device shown in FIG. 1. A shape of the exit surface (an opening surface) of light pipe 26 is projected onto a fluorescent surface of fluorescent wheel 35. A shape of a spot of blue laser light (excitation light) on the fluorescent surface is analogous to a shape of the exit surface (an opening surface) of light pipe 26. A light source image of the spot on the fluorescent surface is formed, as light source image 58a or light source image 58b, on first image forming surface 55.

Next, still another configuration example of each of first and second surface light sources 50a and 50b and first and second double telecentric optical systems 52a and 52b will be described.

First and second surface light sources 50a and 50b each have a plurality of light source parts that are different in light emitting color, respectively, and first and second double telecentric optical systems 52a and 52b may be provided for each light emitting color. In this case, first optical system 51 may have a first color synthesis section that synthesizes a plurality of light fluxes emitted from the above plurality of light source parts of first surface light source 50a to emit the light flux along the same optical path, and a second color synthesis section that synthesizes a plurality of light fluxes emitted from the above plurality of light source parts of second surface light source 50b to emit the light flux along the same optical path.

FIG. 11 shows an example of a light source part provided with light sources of respective colors of red, blue, and green.

Referring to FIG. 11, light source part 71 includes green light source part 72, blue light source part 73, red light source part 74, and dichroic mirrors 75 and 76.

Green light source part 72 includes a configuration shown in FIG. 11. Each of red light source part 74 and blue light source part 73 includes a configuration shown in FIG. 10. In red light source part 74, solid light sources 11a, 11b, 12a and 12b are constituted of red LDs. In blue light source part 73, solid light sources 11a, 11b, 12a and 12b are constituted of blue LDs.

Dichroic mirror 75 has the reflection and transmission characteristics of reflecting the light of the wavelength region of the blue color and transmitting the light of the other wavelength region, in the wavelength region of the visible light. Dichroic mirror 76 has reflection and transmission characteristics of reflecting light of a wavelength region of a green color and transmitting light of the other wavelength region, in the wavelength region of the visible light.

Dichroic mirror 75 is disposed at a position where an optical axis of red light source part 74 and an optical axis of blue light source part 73 cross at right angles. Red light emitted from red light source part 74 enters one surface of dichroic mirror 75, and blue light emitted from blue light source part 73 enters the other surface of dichroic mirror 75. An angle formed by the optical axis of red light source part 74 and the one surface of dichroic mirror 75 is 45°, and an angle formed by the optical axis of blue light source part 73 and the other surface of dichroic mirror 75 is 45°.

The red light from red light source part 74 is transmitted through dichroic mirror 75. The blue light from blue light source part 73 is reflected in the same direction as a direction of transmitted green light in dichroic mirror 75. That is, dichroic mirror 75 emits first compound light in which the red light and the blue light are mixed.

Dichroic mirror 76 is disposed at a position where the optical axis of red light source part 74 and an optical axis of green light source part 72 cross at right angles. The first compound light (blue and green) from dichroic mirror 75 enters one surface of dichroic mirror 76, and green light emitted from green light source part 72 enters the other surface of dichroic mirror 76. An angle formed by the optical axis of red light source part 74 and the one surface of dichroic mirror 76 is 45°, and an angle formed by the optical axis of green light source part 72 and the other surface of dichroic mirror 76 is 45°.

The first compound light from dichroic mirror 75 is transmitted through dichroic mirror 76. The green light from green light source part 72 is reflected in the same direction as a direction of the transmitted first compound light in dichroic mirror 76. That is, dichroic mirror 76 emits second compound light (white light) in which the first compound light (blue and red) and the green light are mixed. The second compound light (the white light) is output light of light source part 71.

Light source part 71 described above can be applied to each of the light source part comprising first surface light source 50a and first double telecentric optical system 52a and the light source part comprising second surface light source 50b and second double telecentric optical system 52b in the light source device shown in FIG. 1.

Note that an order to synthesize the respective light fluxes from green light source part 72, red light source part 74 and blue light source part 73 in light source part 71 can be suitably changed. For example, the green light from green light source part 72 and the blue light from blue light source part 73 may be synthesized, and the first compound light in which the green light and the blue light are mixed may be synthesized with the red light from red light source part 74.

Furthermore, diffusion plates for use in red light source part 74 and blue light source part 73, respectively, in light source part 71 can be configured in common. For example, a diffusion plate that is common to red light source part 74 and blue light source part 73 may be provided on the optical path between dichroic mirror 75 and dichroic mirror 76. In this case, the diffusion plate may be vibrated in order to reduce speckles.

(Projection Type Display Apparatus)

The present projection type display apparatus has the above described light source device, a display element that modulates light output from the light source device to form an image, and a projection lens that projects the image formed by the display element. As the display element, a liquid crystal display panel or a DMD can be used. Note that when the liquid crystal display panel is applied to the display element, it is necessary that the apparatus is configured to irradiate the liquid crystal display panel with p-polarized or s-polarized light.

FIG. 12 schematically shows the configuration of the projection type display apparatus.

Referring to FIG. 12, the projection type display apparatus is a three-plate type projector, and includes a light source device 501 provided with a light source part 71 shown in FIG. 11. In FIG. 12, respective components of light source device 501 are not shown for convenience.

White light emitted from optical element 57 of light source device 501 enters total internal reflection (TIR) prism 505 via lenses 502 and 503 and reflection mirror 504. As optical element 57, there can be used a light tunnel including a hollow interior and an inner surface constituted of a mirror, a prismatic columnar rod formed of a transparent material such as glass, or the like.

TIR prism 505 is a total reflection prism assembly provided with a total reflection surface therein, and includes two triangular prisms. One of the triangular prisms is a right angle prism, and has first and second surfaces that constitute sides to form right angles and a third surface that constitutes an oblique side. The other triangular prism has first to third surfaces that constitute respective line segments of a triangle. The third surface of the right angle prism is disposed to face the first surface of the other triangular prism. The first surface of the right angle prism is an entrance surface of TIR prism 505.

Color prism 506 is disposed to face the second surface of the right angle prism. The second surface of the other triangular prism is an exit surface of TIR prism 505, and is parallel to the second surface of the right angle prism. Projection lens 510 is disposed on a side of this exit surface.

Light (white light) from reflection mirror 504 enters an entrance surface of TIR prism 505. The light that enters TIR prism 505 is totally reflected by an internal total reflection surface to exit from the second surface of the right angle prism. The light that exits from this second surface enters color prism 506.

Color prism 506 comprises a plurality of prisms, and has first to fourth surfaces. The first surface faces the second surface of the right angle prism of TIR prism 505. Display panel 508 for red is disposed to face the second surface, display panel 507 for green is disposed to face the third surface, and display panel 509 for blue faces the fourth surface. In color prism 506, as to the white light that enters the first surface, the red light exits from the second surface, the green light exits from the third surface, and the blue light exits from the fourth surface. Here, a digital mirror device (DMD) or a liquid crystal display panel may be used as display panels 507 to 509. Here, the DMDs are used as display panels 507 to 509.

Each of display panels 507 to 509 has an image forming region comprising a plurality of micromirrors arranged in a matrix manner. The micromirror is configured so that an angle changes depending on a drive voltage, and a reflection angle differs between a case where the drive voltage indicating an on-state is supplied and a case where the drive voltage indicating an off-state is supplied. Each micromirror is controlled to turn on and off depending on a video signal, so that an incident light flux is spatially modulated to form an image.

The red light that exits from the second surface enters display panel 508 for red. Display panel 508 for red spatially modulates the entering red light to form a red image. Red image light enters the second surface of color prism 506 from display panel 508 for red. In color prism 506, the red image light entering the second surface exits from the first surface. This red image light exiting from this first surface enters the second surface of the right angle prism of TIR prism 505.

The green light exiting from the third surface enters display panel 507 for green. Display panel 507 for green spatially modulates the entering green light to form a green image. Green image light enters the third surface of color prism 506 from display panel 507 for green. In color prism 506, the green image light entering the third surface exits from the first surface. The green image light exiting from this first surface enters the second surface of the right angle prism of TIR prism 505.

The blue light exiting from the fourth surface enters display panel 509 for blue. Display panel 509 for blue spatially modulates the entering blue light to form a blue image. Blue image light enters the fourth surface of color prism 506 from display panel 509 for blue. In color prism 506, the blue image light entering the fourth surface exits from the first surface. The blue image light exiting from this first surface enters the second surface of the right angle prism of TIR prism 505.

In TIR prism 505, the red image light, the green image light and the blue image light entering the second surface of the right angle prism are emitted from the exit surface toward projection lens 510. In projection lens 510, the red image, the green image and the blue image formed in display panel 508 for red, display panel 507 for green and display panel 509 for blue, respectively, are superimposed and projected onto a screen. Projection lens 510 is an expanding projection optical system comprising a plurality of lenses.

In light source device 501, a first light source part comprising first surface light source 50a and first double telecentric optical system 52a and a second light source part comprising second surface light source 50b and second double telecentric optical system 52b have the same structure as each other. Consequently, in illumination light that illuminates the DMD, color unevenness generated due to a difference in in-place distribution of red, blue and green can be reduced.

Furthermore, in consideration of the restriction of the etendue, the smaller spot size of the green light source part on the fluorescent surface is better. However, when the spot size is decreased, damage is caused to the fluorescent substance due to heat. Consequently, the shape and size of the spot on the fluorescent surface are suitably designed on the basis of the intensity (light density) of the excitation light on the fluorescent substance, the acceptance angle of the light flux emitted from the fluorescent substance, the incident angle of the light flux into optical element 57, the aspect ratio of the entrance surface of optical element 57, the configuration of the optical system in the optical path from the fluorescent substance to optical element 57, and the like.

When the internal reflection surface of light guide section 57a that constitutes optical element 57 is formed in a tapered shape, an area of the surface light source slightly increases, but a divergence angle of the light exiting from the exit surface can be decreased. As a result, loss of light entering into an optical component with a predetermined size can be decreased.

Note that the above described light source device of the present invention is an example, and change and/or improvement, which can be understood by a person skilled in the art, can be applied to the configuration of the device without departing from the gist of the invention. For example, in the configuration shown in FIG. 1, first optical system 51 may be an optical system of any structure, as long as the system has a structure that forms the light source images of surface light sources 50a and 50b in different regions on first image forming surface 55 and that includes reflection element 53 provided with first reflection surface 53a that reflects the first light flux from first surface light source 50a toward first image forming surface 55 and second reflection surface 53b that reflects the second light flux from second surface light source 50b toward first image forming surface 55 and that is at right angles to first reflection surface 53a.

REFERENCE SIGNS LIST 50a first surface light source
50b second surface light source
first optical system
52a first double telecentric optical system
52b second double telecentric optical system
53 reflection element
53a first reflection surface
53b second reflection surface
virtual image forming surface
first image forming surface
56 second optical system
optical element
57a light guide section
57b entrance surface
57c exit surface

The invention claimed is:

1. A light source device comprising:
first and second surface light sources;
a first optical system that forms light source images of said first and second surface light sources in different regions on an identical image forming surface;
an optical element that is provided with a columnar light guide section and in which one of both end surfaces of the light guide section is considered as an entrance surface, and the other surface is considered as an exit surface; and
a second optical system that forms, on said entrance surface of said light guide section, an image of a synthesis surface light source comprising the light source images of said first and second surface light sources which are formed on said image forming surface,
wherein said first optical system includes a reflection element provided with a first reflection surface that reflects a first light flux from said first surface light source toward said image forming surface, and a second reflection surface that reflects a second light flux from said second surface light source toward said image forming surface and that is at right angles to said first reflection surface.

2. The light source device according to claim 1, wherein the first optical system further includes:
a first double telecentric optical system that is provided between said first surface light source and said first reflection surface and that emits said first light flux; and
a second double telecentric optical system that is provided between said second surface light source and said second reflection surface and that emits said second light flux in a direction opposite to said first light flux,
wherein an emission optical axis of said first double telecentric optical system and an emission optical axis of said second double telecentric optical system form the same axis.

3. The light source device according to claim 2, wherein said first and second double telecentric optical systems and said reflection element are arranged so that said synthesis surface light source has a predetermined shape.

4. The light source device according to claim 2, wherein when seen from a direction vertical to a surface that is perpendicular to said first and second reflection surfaces, an apex angle portion that comprises a joined portion of said first and second reflection surfaces is disposed on an emission optical axis side of said first and second double telecentric optical systems from an outermost peripheral portion of said first and second light fluxes.

5. The light source device according to claim 1, wherein said reflection element comprises a prism provided with first and second surfaces that form right angles to each other, and said first and second surfaces constitute said first and second reflection surfaces, respectively.

6. The light source device according to claim 1, wherein each of said first and second surface light sources includes:
an excitation light source that emits excitation light; and
a fluorescent portion provided with a fluorescent substance that is excited by said excitation light to emit fluorescence.

7. The light source device according to claim 6, wherein said fluorescent substance emits green fluorescence.

8. The light source device according to claim 2, wherein each of said first and second surface light sources includes a plurality of light source parts that each emit a light having a different color,
said first and second double telecentric optical systems are provided for each light emitting color, and
said first optical system includes:
a first color synthesis section that synthesizes a plurality of light fluxes emitted from said plurality of light source parts of said first surface light source to emit the light fluxes along the same optical path; and
a second color synthesis section that synthesizes a plurality of light fluxes emitted from said plurality of light source parts of said second surface light source to emit the light fluxes along the same optical path.

9. The light source device according to claim 8, wherein said plurality of light source parts includes a red light source part that emits red light, a blue light source part that emits blue light, and a green light source part that emits green light.

10. The light source device according to claim 9, wherein said red light source part and said blue light source part comprise solid light sources, and
said green light source part includes:
an excitation light source that emits excitation light; and
a fluorescent portion provided with a fluorescent substance that is excited by said excitation light to emit green fluorescence.

11. The light source device according to claim 1, wherein said second optical system includes a double telecentric lens optical system.

12. A projection type display apparatus comprising:
the light source device according to claim 1;
a display element that modulates light output from said light source device to form an image; and
a projection lens that projects the image formed by said display element.

* * * * *